United States Patent [19]

Anderson et al.

[11] Patent Number: 5,095,415

[45] Date of Patent: Mar. 10, 1992

[54] LIGHT FIXTURE FOR EXTERNALLY ILLUMINATED SIGN

[75] Inventors: Harry B. Anderson, Hudson, Wis.; David L. Wortman, Saint Mary's Point; Sanford Cobb, Jr., St. Paul, both of Minn.

[73] Assignee: Minnesota Mining and Manufacturing Company, St. Paul, Minn.

[21] Appl. No.: 429,178

[22] Filed: Oct. 30, 1989

[51] Int. Cl.⁵ .............................................. F21V 5/00
[52] U.S. Cl. .................................. 362/329; 362/331; 362/334; 362/337; 362/340; 362/812
[58] Field of Search ............... 362/309, 331, 335, 336, 362/337, 338, 339, 326, 329, 333, 334, 812

[56] References Cited

U.S. PATENT DOCUMENTS

| Re. 13,600 | 7/1913 | Mygatt | 362/334 |
| 736,535 | 8/1903 | Mygatt | 362/334 |
| 2,115,178 | 4/1938 | Rolph | 362/331 |
| 2,151,801 | 3/1939 | Rolph | 362/331 |
| 2,818,500 | 12/1957 | Franck | 362/333 X |
| 3,223,833 | 12/1965 | Protzmann | 362/338 X |
| 4,260,220 | 4/1981 | Whitehead | 350/96.28 |
| 4,615,579 | 10/1986 | Whitehead | 350/96.1 |
| 4,737,896 | 4/1988 | Mochizuki et al. | 362/339 X |
| 4,750,798 | 6/1988 | Whitehead | 350/96.10 |
| 4,787,708 | 12/1988 | Whitehead | 350/96.10 |
| 4,834,495 | 5/1989 | Whitehead et al. | 350/96.28 |
| 4,850,665 | 7/1989 | Whitehead | 350/96.10 |

FOREIGN PATENT DOCUMENTS 0225123 6/1987 European Pat. Off. .
0235447 9/1987 European Pat. Off. .
0292159 11/1988 European Pat. Off. .

*Primary Examiner*—Stephen F. Husar
*Attorney, Agent, or Firm*—Gary L. Griswold; Walter N. Kirn; Stephen W. Buckingham

[57] ABSTRACT

A light fixture has a housing having an axis and a light source for detecting light into the housing along the housing axis. A first section of the housing occupies a first portion of the housing's perimeter and includes a light guide material. A second section of the housing occupies a second portion of the housing's perimeter and includes light extraction structures and a Fresnel lens for beam shaping.

15 Claims, 1 Drawing Sheet

LIGHT FIXTURE FOR EXTERNALLY ILLUMINATED SIGN

BACKGROUND OF THE INVENTION

Outdoor signs often must be lighted so that they will be visible at night. For example, it is desirable that advertising signs be visible after dark and it may be critical that traffic signs be visible. Various schemes of internally and externally illuminating such signs have been used. When external illumination is used, the most common method is to align a row of spotlights along either the bottom or the top of the sign. Those spotlights are positioned to direct light toward the sign. This provides several disadvantages, most notably the lack of uniformity of illumination. The sign will receive more light close to the spotlight than it will in other regions. A system providing uniform lighting would be desirable.

An additional problem is particularly acute in the case of overhead signs commonly used on multilane highways. Replacement of light sources commonly requires that traffic be diverted or stopped so that a worker can reach the light source to be replaced. A system with which the actual light source can be located beyond the traffic carrying portion of the highway would be advantageous.

SUMMARY OF THE INVENTION

According to the invention, a light fixture includes a housing having an axis and a light source for directing light into the housing along the housing axis. A first section of the housing occupies a first portion of the housing's perimeter and comprises a light guide material. A second section of the housing occupies a second section of the housing perimeter and has light extraction structures internal to the housing and a Fresnel lens external to the housing.

DETAILED DESCRIPTION OF A PREFERRED EMBODIMENT

In the present invention a light guide confines a beam of light to travel along one edge of a sign. An extractor removes light from the light guide and directs it toward the sign. Associated with the extractor is a Fresnel lens for shaping the output characteristics of the illuminator.

Figure 1:
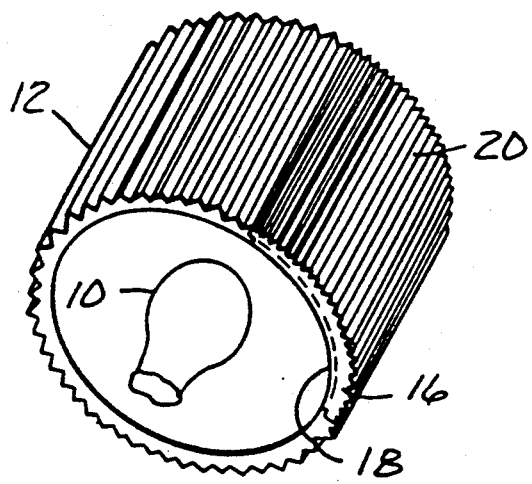
FIG. 1 is a view of a light Fixture according to the invention.

FIG. 1 shows an illuminator of the present invention. The illuminator includes a light source 10, providing a partially collimated beam of light. A housing in the form of a tube, that is preferably a right circular cylinder, although other shapes may be used, receives light from the light source. Part of the circumference of the illuminator is made up of a light guide material 12 while the remainder is an extractor 16. As shown, the light guide section 12 makes up 270 degrees of the circumference while the remaining 90 degrees is extractor portion 16. The relative amounts of the circumference occupied by each of these portions, however, is implementation dependent and must be determined on a case by case basis. Furthermore light source 10 could be separated from extractor 16 by a light guide of material similar to that of light guide portion 12. The primary reason for doing this would be to locate the light source in a more convenient position for replacing bulbs or lighting elements. This is particularly useful in the case of overhead signs since the light conduit can carry the light from the edge of a highway to the extractor adjacent the sign.

Light guide material 12 has running along its external surface a plurality of linear prisms such as prism 14. In a preferred embodiment these prisms are right angled isosceles prisms, although that is not required. These prisms serve to confine light traveling along the illuminator to remain in the illuminator by means of total internal reflection. The light guide material may, for example, be Scotch Optical Lighting Film, a product commercially available from 3M and described in U.S. patent application Ser. No. 218,087 filed July 12, 1988, now U.S. Pat. No. 4,906,070. Light extractor portion 16 has an inner surface 18 and an outer surface 20. The nature of these structures will be more fully described in accordance with FIGS. 2, 3 and 4.

Figure 2:
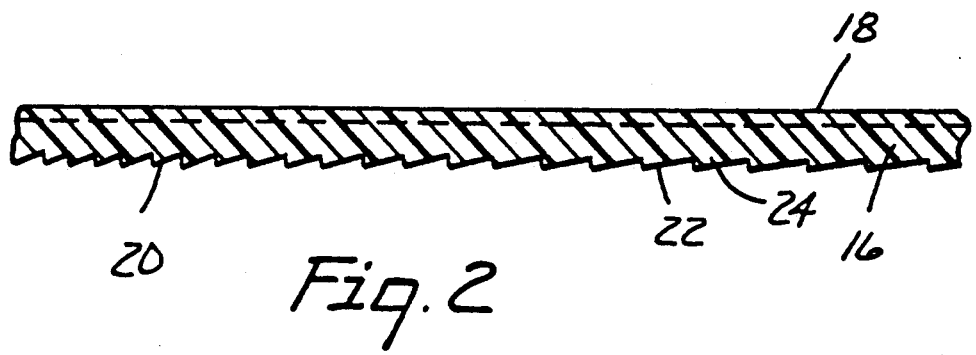
FIG. 2 is first a cross sectional view of a light extraction film used in the invention.

FIG. 2 shows a cross section of extraction film 16 perpendicular to the axis of the tube. Extraction film 16 is of a transparent material, preferably a transparent polymeric material. Preferred polymers are polycarbonates. As may be seen there are a plurality of structures such as structure 22 and structure 24 on surface 20. These structures are the linear elements of a Fresnel lens. Each element has an axis that runs parallel to the direction of the housing axis. The nature of the Fresnel lens formed by the structures on surface 20 will depend upon the desired output light beam. Typically the desire is to provide relative constant illumination over the surface of a sign. Thus a Fresnel lens should be designed to provide output that would appear uniform over the sign.

Figure 3:
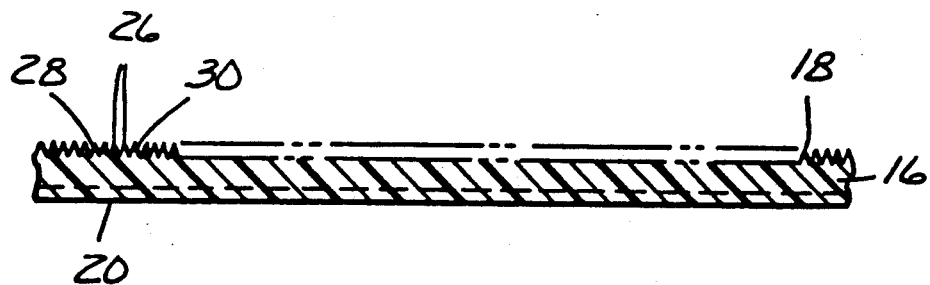
FIG. 3 is a second cross sectional view of a light extraction film used in the invention.

FIG. 3 is a cross section of film 16 parallel to the axis of the tube. As shown in FIG. 3, side 18 of film 16 has a plurality of triangular prisms lying thereon. Each prism has an axis that is perpendicular to the housing axis. For these purposes, the axis will be considered perpendicular to the housing axis when the tube is round, because the tangent to the axis is perpendicular at all points. As shown, the prisms are isosceles triangles, but that is not required. The use of isosceles prisms is preferred, however, because they will work equally well with light from either direction. Therefore the light fixture may be illuminated at both ends to provide both more light and greater uniformity. The operation of the prisms as light extractors may be understood with reference to prism 26. Prism 26 has two sides 28 and 30. In operation, light enters prism 26 through one of the two sides, for example, side 28, and crosses the prism striking side 30. At 30 the light undergoes total internal reflection and is reflected through film 16 and out through surface 20 where, in combination with the light traveling through the remainder of the film, it forms the desired shaped beam.

It has been found that prisms having included angles in the range of 59 to 79 degrees are preferred, with a particularly preferred value of 69 degrees.

Figure 4:
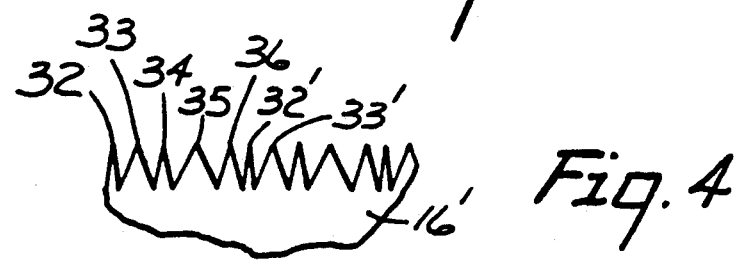
FIG. 4 is a cross sectional view of an alternative light extraction film for use in the invention.

As previously explained, the nature of the output beam will be shaped by the Fresnel lens on surface 20. This shaping, however, only affects the distribution of the light in the direction perpendicular to the original beam. In the direction parallel to the beam the distribution is controlled by the extraction structures on surface 18. If, as shown in FIG. 3, the structures are all triangles having the same included angle, the light will emerge collimated in the direction parallel to the original light beam. As shown in FIG. 4, film 16, has a plurality of isosceles triangles having varying included angles provided thereon. Typically these will be in a repeating series. As may be seen in FIG. 4, prisms 32, 33, 34, 35 and 36 each have different included angles. The sequence then begins again with prism 32' and 33' having equal included angles to prisms 32 and 33 respectively. The number of prisms in the sequence to be repeated is not fixed, but will be determined by the requirements of a particular design. For example, in one extraction film manufactured for a test a series of seven prisms was utilized. These prisms had included angles of 78.5 degrees, 63.5 degrees, 71.0 degrees, 76.0 degrees, 66.0 degrees, 73.5 degrees, and 68.5 degrees. After one group of such prisms, the pattern repeats. The advantage of varying the prism angles in this manner is light is spread out over a wider range of angles in the direction parallel to the original beam rather than collimated, as occurs when a single included angle is used.

Figure 5:
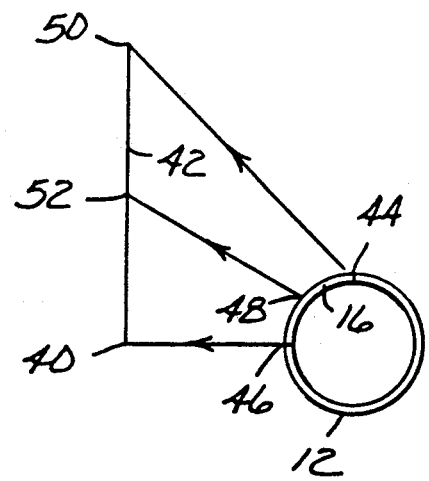
FIG. 5 is a schematic representation of a light fixture according to the invention in operation.

FIG. 5 illustrates how the illuminator of the present invention works in practice. As may be seen, it runs parallel to one edge, in this case the bottom edge, 40, of a sign 42. Extractor 16 has a top edge 44, bottom edge 46 and a center 48. The Fresnel lens on exterior side 20 of extractor 16 is designed such that light passing through top edge 44 of extractor 16 will strike the sign 42 at its top edge 50. Similarly light traveling through bottom edge 46 of extractor 16 will strike sign 42 at its bottom 40 and light traveling through extractor 16 at center 48 will strike sign 42 at its center 52. The effect of this is to provide more uniform lighting over the entire sign. Additional correction could be made to further increase the uniformity of illumination, but the design shown in FIG. 5 has been shown to provide no worse than a two to one ratio in light intensity between the brightest and dimmest parts of the sign, a value well within acceptable limits.

What is claimed:

1. A light fixture for providing light to an externally illuminated sign, said light fixture comprising:
   a light source for producing a partially collimated beam of light;
   a housing having an axis, said housing and said light source being positioned such that said partially collimated beam of light is directed into said housing along said housing axis, said housing having a first section occupying a first portion of its perimeter and a second section occupying a second portion of its perimeter said first section being a light guide means and said second section having a first surface interior to said housing and a second surface exterior to said housing, said first surface having light extraction structures thereon, said light extraction structures being for extracting light from said beam of partially collimated light and directing it toward said second surface, said second surface having a Fresnel lens formed thereon.

2. The light fixture of claim 1 wherein said first section of said housing has an external surface, said external surface having a plurality of linear right isosceles prisms thereon, each of said prisms having an axis, said axes of said prisms running parallel to said housing axis.

3. The light fixture of claim 2 wherein said light extraction structures comprise a plurality of triangular prisms on said first surface each of said prisms having a axis, said axes of said prisms running perpendicular to said housing axis.

4. The light fixture of claim 3 wherein said prisms have included angles in the range of 59 to 79.

5. The light fixture of claim 4 wherein said Fresnel lens comprises a plurality of linear structures on said external surface of said second section of said housing, each of said linear structures having an axis, said axes of said linear structures running parallel to said housing axis.

6. The light fixture of claim 4 wherein said Fresnel lens produces a light distribution such that the ratio between the light intensity received at any point on the sign and that received at any other point is no greater than two to one.

7. The light fixture of claim 3 wherein said prisms are divided into repeating groups wherein said prisms of a group have varying included angles.

8. The light fixture of claim 7 wherein said Fresnel lens comprises a plurality of linear structures on said external surface of said second section of said housing, each of said linear structures having an axis, said axes of said linear structures running parallel to said housing axis.

9. The light fixture of claim 8 wherein said Fresnel lens produces a light distribution such that the ratio between the light intensity received at any point on the sign and that received at any other point is no greater than two to one.

10. The light fixture of claim 1 wherein said light extraction structures comprise a plurality of triangular prisms on said first surface, each of said prisms having a axis, said axes of said prisms running perpendicular to said housing axis.

11. The light fixture of claim 10 wherein said prisms have included angles in the range of 59° to 79°.

12. The light fixture of claim 11 wherein said Fresnel lens comprises a plurality of linear structures on said external surface of said second section of said housing, each of said linear structures having an axis, said axes of said linear structures running parallel to said housing axis.

13. The light fixture of claim 12 wherein said Fresnel lens produces a light distribution such that the ratio between the light intensity received at any point on the sign and that received at any other point is no greater than two to one.

14. The light fixture of claim 1 wherein said Fresnel lens comprises a plurality of linear structures on said external surface of said second section of said housing, each of said linear structures having an axis, said axes of said linear structures running parallel to said housing axis.

15. The light fixture of claim 14 wherein said Fresnel lens produces a light distribution such that the ratio between the light intensity received at any point on the sign and that received at any other point is no greater than two to one.

* * * * *